(12) United States Patent
Giera

(10) Patent No.: US 11,079,745 B2
(45) Date of Patent: Aug. 3, 2021

(54) RAPID CLOSED-LOOP CONTROL BASED ON MACHINE LEARNING

(71) Applicant: Lawrence Livermore National Security, LLC, Livermore, CA (US)

(72) Inventor: Brian Giera, Oakland, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 627 days.

(21) Appl. No.: 14/952,665

(22) Filed: Nov. 25, 2015

(65) Prior Publication Data
US 2017/0144378 A1   May 25, 2017

(51) Int. Cl.
*G05B 19/418* (2006.01)
*G05B 13/02* (2006.01)
(Continued)

(52) U.S. Cl.
CPC ........ *G05B 19/41875* (2013.01); *B22F 10/20* (2021.01); *G05B 13/0265* (2013.01); *G06N 20/20* (2019.01); *B22F 10/30* (2021.01); *B33Y 50/02* (2014.12); *G05B 2219/32018* (2013.01); *G05B 2219/33034* (2013.01); *Y02P 90/02* (2015.11)

(58) Field of Classification Search
CPC .............. B29C 67/0088; B29C 64/393; G05B 13/0265; G05B 19/41875; G05B 2219/33034; G05B 2219/32018; B22F 10/20; B22F 10/30; G06N 20/20; Y02P 10/25; Y02P 90/02; B33Y 50/02
See application file for complete search history.

(56) References Cited

U.S. PATENT DOCUMENTS

2009/0157571 A1\* 6/2009 Smith .................. G06K 9/6292
706/12
2011/0265197 A1\* 10/2011 Depinho .................. C12N 9/16
800/14
(Continued)

OTHER PUBLICATIONS

Bie, T.D. et al., "Machine Learning with Labeled and Unlabeled Data," European Symposium on Artificial Neural Networks—Advances in Computational Intelligence and Learning, Bruges (Belgium), Apr. 22-24, 2009, 10 pages.
(Continued)

*Primary Examiner* — Vongsavanh Sengdara
(74) *Attorney, Agent, or Firm* — Perkins Coie LLP

(57) ABSTRACT

A system for rapidly adapting production of a product based on classification of production data using a classifier trained on prior production data is provided. A production control system includes a learning system and an adaptive system. The learning system trains a production classifier to label or classify previously collected production data. The adaptive system receives production data in real time and classifies the production data in real time using the production classifier. If the classification indicates a problem with the manufacturing of the product, the adaptive system controls the manufacturing to rectify the problem by taking some corrective action. The production classifier is trained using bootstrap data and corresponding example data extracted from prior production data. Once the bootstrap data is labeled, the corresponding example data is automatically labeled for use as training data.

34 Claims, 8 Drawing Sheets

(51) Int. Cl.
  *G06N 20/20* (2019.01)
  *B22F 10/20* (2021.01)
  *B33Y 50/02* (2015.01)
  *B22F 10/30* (2021.01)

(56) References Cited

U.S. PATENT DOCUMENTS

2013/0127869 A1* 5/2013 Winnemoeller ...... G06T 11/203
  345/441
2015/0278332 A1* 10/2015 Dygas .................. G06F 16/254
  707/602
2016/0313463 A1* 10/2016 Wahrmund .............. G01V 1/30

OTHER PUBLICATIONS

Krizhevsky, A. et al., "ImageNet Classification with Deep Convolutional Neural Networks," Retrieved on: Nov. 25, 2015, Available, at: http://papers.nips.cc/paper/4824-imagenet-classification-with-deep-convolutional-neural-networks.pdf.

Miclet, L., et al., "Analogical Dissimilarity: Definition, Algorithms and Two Experiments in Machine Learning", Journal of Artificial Intelligence and Research, vol. 32, p. 793, 811, 2008.

Statistical classification, https://en.wikipedia.org/wiki/Statistical_classification, accessed Oct. 16, 2020.

Support vector machine, https://en.wikipedia.org/wiki/Support_vector_machine, accessed Oct. 16, 2020.

* cited by examiner

RAPID CLOSED-LOOP CONTROL BASED ON MACHINE LEARNING

BACKGROUND

Current manufacturing techniques rely in large part on computers to control the equipment (e.g., machines) used to manufacture products. As an example, in a mass production line to assemble a product (e.g., an automobile), computers control robotic arms that position components in place, weld the components together, polish the welds, and so on. The computers may be connected to many different types of sensors to ensure that the product is being assembled to specification. For example, when positioning a component, a computer may determine that a component is correctly positioned based on data received from an optic sensor and, when the component is positioned correctly, control the robotic arm to start welding. After the welding is complete, the computer may determine whether the weld meets acceptable quality standards based on various measurements received from sensors that, for example, measure the height, width, and length of the weld or measure the temperature of the welder during the welding process. If the weld does not meet acceptable quality standards, the computer may direct a conveyor to divert the product from the assembly line for corrective action and may alert a technician to perform maintenance on the welder or robotic arm.

Manufacturing is currently evolving to meet the need to develop custom products rapidly. For example, a company that is manufacturing a product may need a component that is not readily available. The company may have the component custom made at a shop that specializes in making custom products layer by layer. The shop may employ additive manufacturing techniques to build up custom products. To build a custom product, the specifications (e.g., dimensions and materials) are supplied to a computer that controls the repeated adding of raw material to build up the custom product. Additive manufacturing techniques (sometime referred to as 3-D printing) include extrusion deposition, sintering of granular material, lamination, photopolymerization, and so on.

FIG. 1 is a diagram that illustrates an additive manufacturing process based on selective laser melting ("SLM"). During manufacturing of an object, layers of fabrication powder are successively deposited on a fabrication bed. After each layer is deposited, a laser selectively melts portions of the layer to additively build the object in an object container system layer-by-layer. An SLM system 100 includes a laser system 110 and an object fabrication system 120. The laser system includes a laser 111 and a scanner system 112 to control laser beam 113. The object fabrication system includes a powder delivery system 130 and an object container system 140. The powder delivery system includes a powder delivery piston 131 and a roller 132. The object container system includes a fabrication piston 141 and the object 142 that is being fabricated. At the start of each layer, the powder delivery piston moves up to feed more powder, and the fabrication piston moves down to make room for more powder. The roller then rolls the powder over the top of the object container system where there is room to deposit the powder. The scanner system directs the laser to selectively melt portions of the newly deposited powder. The specifications indicate what portions of the powder are to be melted for each layer. This process is repeated for each layer. After the last layer has been selectively melted, the object (i.e., the melted powder) can be removed from the powder that was not melted.

During manufacturing processes, vast amounts of data are currently being collected and stored, and even more data could be collected and stored. For example, an SLM system may employ sensors to measure the temperature during melting, roughness and density of a layer, dimensions of a layer, and so on. This data can be used to determine whether a product meets its manufacturing specifications. In addition, the data collected from the manufacture of multiple products can be used to make improvements in the manufacturing, such as preventing certain types of recurring defect.

DETAILED DESCRIPTION

Figure 1:
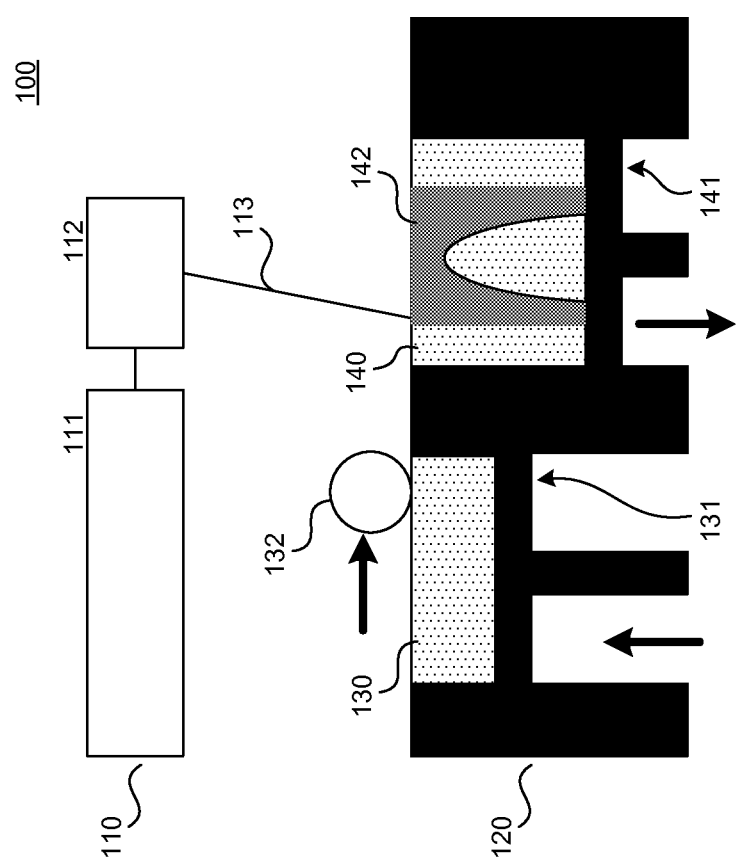
FIG. 1 is a diagram that illustrates an additive manufacturing process based on selective laser melting ("SLM").

A method and system for rapidly adapting production of a product based on classification of production data using a classifier trained on prior production data is provided. In some embodiments, a production control system includes a learning system and an adaptive system. The learning system trains a production classifier to label or classify previously collected production data (e.g., as being acceptable or unacceptable). For example, if the production data is a video of a weld as a welder moves across a surface, the production classifier may be trained to classify a frame of a video based on weld characteristics indicating quality of the weld. The weld characteristics may include perfect, a break in the weld, a pit in the weld, a weakly sintered weld, a small glob, a medium glob, and so on. The adaptive system receives production data in real time and classifies the production data in real time using the production classifier. If the classification indicates a problem with the manufacturing of the product, the adaptive system controls the manufacturing to rectify the problem by taking some corrective action. For example, if successive frames of a video of a weld during the welding process indicate a break, then the adaptive system may direct that the welder move back and re-weld the portion with the break. Because the production classifier was trained using prior production data, the production control system can in real time accurately and reliably detect problems and direct the taking of corrective action, forming a loop of receiving production data, analyzing production data, and correcting problems as needed in real time. Even if a problem cannot be corrected in real time, the production system can signal that corrective action is needed or that the product is defective.

In some embodiments, the learning system generates a production classifier to label a certain type of data collected during an occurrence of an activity. For example, the type of data may be video, and the activity may be welding. To generate the production classifier, the learning system receives example data collected from many occurrences of the activity and labels the example data for use as training data when training the production classifier. For example, each frame of the video may be assigned a weld characteristic as a label. The learning system then trains the production classifier using the training data. The learning system may use any of a variety of machine learning techniques such as a neural network, a support vector machine, a decision tree, a k-nearest neighbor algorithm, a linear regression algorithm, a relevance vector machine, ensembles of classifiers, and so on. When training is complete, the production classifier is ready to be put into production to, for example, label frames of a video.

The accuracy of the production classifier depends in large part on the amount of example data (i.e., number of observations) that is available to use in training. If the amount of data is not sufficient, then the production classifier may suffer from overfitting in that the production data may accurately classify only data that is essentially identical to the training data and cannot generalize to other data. Using prior supervised learning techniques, a person needs to view each observation used in training and make a judgment call as to what is the most accurate label for that observation. For example, a person would need to decide whether the frame represents the formation or presence a perfect weld or a small glob. When the amount of data is large, the time needed to label the example data can be so time-consuming that the cost of labeling the data is prohibitively expensive.

To label data in a cost-effective manner, the learning system uses a semi-supervised learning technique in which bootstrap data, representing much less data than the example data, is collected from a stream different from that of the example data and is then labeled. A "stream" is a sequence of data from a sensor. The stream may include only one reading of the sensor (i.e., a sequence of one). For example, a video represents a chronological sequence of captured images from a camera, and a picture represents a single captured image from a camera, which may be the same camera used to capture the video. The bootstrap data may be a picture (referred to as a snapshot) of each completed weld of the example data. So each weld would have a picture as bootstrap data and a video as example data. The bootstrap data and the example data are collected via different data streams during manufacturing. For each picture of a weld to be labeled manually, the picture would be presented to a person who would then mark the portions of the weld that have various weld characteristics. If the picture is of a horizontal weld and the picture is 4096 pixels across, then a person may label pixels 0-791 as being a break, pixels 792-857 as being a small glob, pixels 858-900 as being a pit, pixels 901-2526 as being perfect, and so on. The video camera may be mounted on the welding equipment and move, along with the welder, relative to the surface being welded. Each frame of the video may represent a small window of the most recent portion of the weld. The video thus represents a moving window across the weld. If the weld is 5.12 inches long, then the window may be 0.08 inches across. Because the picture and video are correlated by space (e.g., the left-most portion of the picture represents the first few frames of the video), the learning system can automatically label the frames of the video based on this correlation. Continuing with the example, the learning system would label the first few frames as being a break, the next frames as being a small glob, and so on. After the example data is labeled, the learning system trains the production classifier using the labeled example data as training data.

In some situations, even the manual labeling of the bootstrap data can itself be relatively time-consuming especially when vast amounts of example data are needed. In some embodiments, the learning system may employ seed data that is manually labeled and train a bootstrap classifier using the labeled seed data as training data. The learning system can then use the bootstrap classifier to label the large amount of bootstrap data automatically. The seed data may represent a subset of the example data or may be collected independently of the example data. For example, the seed data may be pictures of completed welds collected from prior runs of the welding equipment and possibly even before the welding equipment is equipped with the video camera. A person could manually label each portion of each picture of the seed data in a manner similar to that described above for labeling the bootstrap data manually. After the bootstrap classifier is generated, the learning system can use the bootstrap classifier to label the bootstrap data, automatically label the example data using the labeled bootstrap data as described above to generate the training data, and then train the production classifier using the training data.

In some embodiments, the adaptive system uses the production classifier that is trained with bootstrap data, which labeled manually or with a bootstrap classifier to provide labels for controlling production. During production, the adaptive system receives target data that is the same type of data as the example data used to train the production classifier. Continuing with the example, the target data would be video taken as the weld is created. As each frame of the video is received, the adaptive system uses the production classifier to label the frame. The adaptive system may provide the label to a corrective action system that decides whether any corrective action is needed (e.g., alter the manufacturing process in real time), and if so, what corrective action is needed. For example, if the corrective action system receives labels of "weakly sintered" for a sequence of frames, the corrective action system may direct the production system to re-weld the corresponding portion of the weld. If, however, the sequence is short and bounded by frames with labels of "perfect," the corrective action system may decide to take no corrective action. If the labels indicate a problem, but the weld is unrepairable, the corrective action system may direct the production system to abort the welding or abandon production of the product.

In some embodiments, the production control system can automatically train a new production classifier in real time as a product is being manufactured when a bootstrap classifier is available. During manufacturing, bootstrap data and example data can be extracted from new production data. The new production data may include new sensor data such as another video capturing a different angle or region of interest of the process, a thermal imaging pyrometer, a chemical detector, and so on. Based on various triggers, the production control system can direct the learning system to retrain the production classifier using the new bootstrap data and example data and possibly using some previously collected bootstrap and example data. The retrained production classifier may more accurately represent current production conditions that lead to a problem. For example, if the welder temperature was much higher during the current production run than in the production run used to generate the training data for training the production classifier, the metal may solidify more slowly in the current production run. As a result, the frames corresponding to, for example, weakly sintered welds in the current production run may contain very different images from those used to train the production classifier. As such, the production classifier may not be able to detect all problems that could be corrected. By retraining the production classifier, the production classifier will be able to adapt to current production conditions. The production classifier may be retrained based on various triggers. The production classifier could be retrained on a periodic basis. The production classifier may be retrained based on the amount of defects found in recently manufactured products. For example, the snapshot of each new weld can be labeled using the bootstrap classifier. If the labeling of the snapshots indicates some threshold level of acceptability has not been met, then the production control system can direct the learning system to retrain the production classifier. In some embodiments, the learning system may incrementally train the production classifier using various incremental machine learning techniques.

The production control system can be used with data other than or in addition to image data (e.g., pictures and video) to control manufacturing. During manufacturing, sensors may be used to collect data that includes various material properties such as coefficient of friction, electrical conductance, opacity, roughness, thickness, color, viscosity (e.g., material being deposited), and so on. Sensors may also be used to collect environmental conditions such as temperature, air pressure, air particulate count, gas concentrations, vibrations, electromagnetic waves, and so on. Sensors may also be used to collect equipment conditions such as nozzle temperature and flow rate, equipment speed, laser intensity, laser area, and so on. In addition, image data need not be based on visible light. For example, the bootstrap data may be ultraviolet light, and a person may be presented with an image (i.e., visible) showing the different frequencies of the ultraviolet light for labeling. Non-image data can be used as bootstrap data and/or example data. For example, the bootstrap data can be roughness of a surface area that is presented to a person for labeling as a map with different shading to represent different levels of roughness, and the corresponding example data can be a video. As another example, the bootstrap data can be pictures, and the example data can be viscosity of material being applied, nozzle temperature, and so on.

In some embodiments, the labeling of bootstrap data for use in automatically labeling the corresponding example data can be used to generate classifiers relating to fields other than manufacturing. For example, in oceanography, the bootstrap data can be images of areas of the ocean, and the example data can be wave height data collected at buoys with wave height sensors. An oceanographer can label portions of the images based on risk to sailboats. The learning system can automatically label corresponding wave height data to generate training data and then train a sailboat risk classifier to assess the risk to sailboats automatically based on the wave height data. As another example, in vehicle traffic flow, the bootstrap data can be images of roadways taken periodically (e.g., every 30 seconds), and the example data can be speed and volume data for the vehicles, weather conditions, lighting conditions, on-ramp meter data, and so on. A traffic engineer can label the images based on level of additional flow that can be accommodated (e.g., on a scale of 1-10). The learning system can automatically label the corresponding example data and then train a traffic classifier to label data collected in real time based on additional flow that can be accommodated and direct an on-ramp metering system to adjust the vehicle flow accordingly. The learning system can be used in many other fields such as meteorology, container processing (e.g., luggage scanning or container ship scanning), medical imaging, autonomous vehicle (e.g., drones, helicopters, unmanned aerial vehicles, planes) operation, threat detection, robots, satellite monitoring, and so on.

Figure 2:
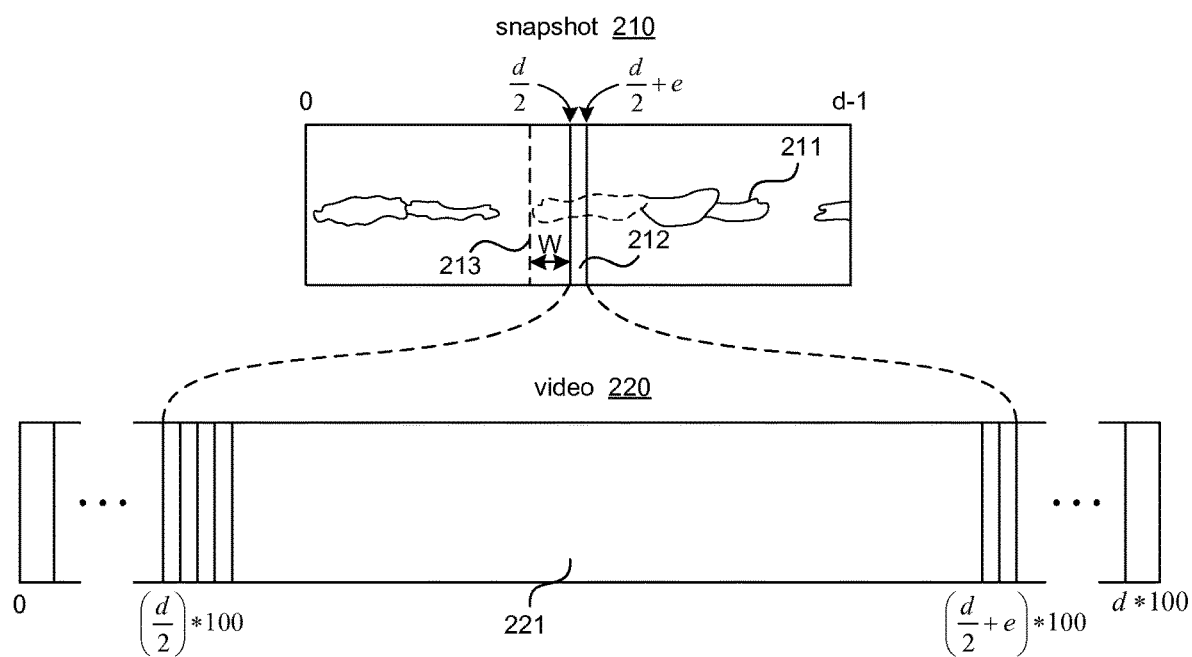
FIG. 2 is a diagram that illustrates an example relationship between a snapshot of a weld and a video of the welding process.

FIG. 2 is a diagram that illustrates an example relationship between a snapshot of a weld and a video of the welding process. A snapshot 210 was taken after the welding was completed, and a video 220 was taken while welding. The snapshot includes d pixels in the horizontal direction. A drawing 211 of the snapshot represents the weld. A snapshot portion 212 illustrates the start and the end of the snapshot that corresponds to a video portion 221 of the video. The snapshot portion starts at pixel d/2 and ends at pixel d/2+e. The video includes d*100 frames, and the video portion starts at frame d/2*100 and ends at (d/2+e)*100. When the video camera was positioned over the weld corresponding to pixel d/2, it collected a frame 213 bounded on the right by pixel d/2 and extending W pixels to the left. Each frame represents a moving window with a width of W pixels. As the video camera moves (e.g., continuously) with the welder, it captures 100 frames per pixel of the snapshot.

Figure 3:
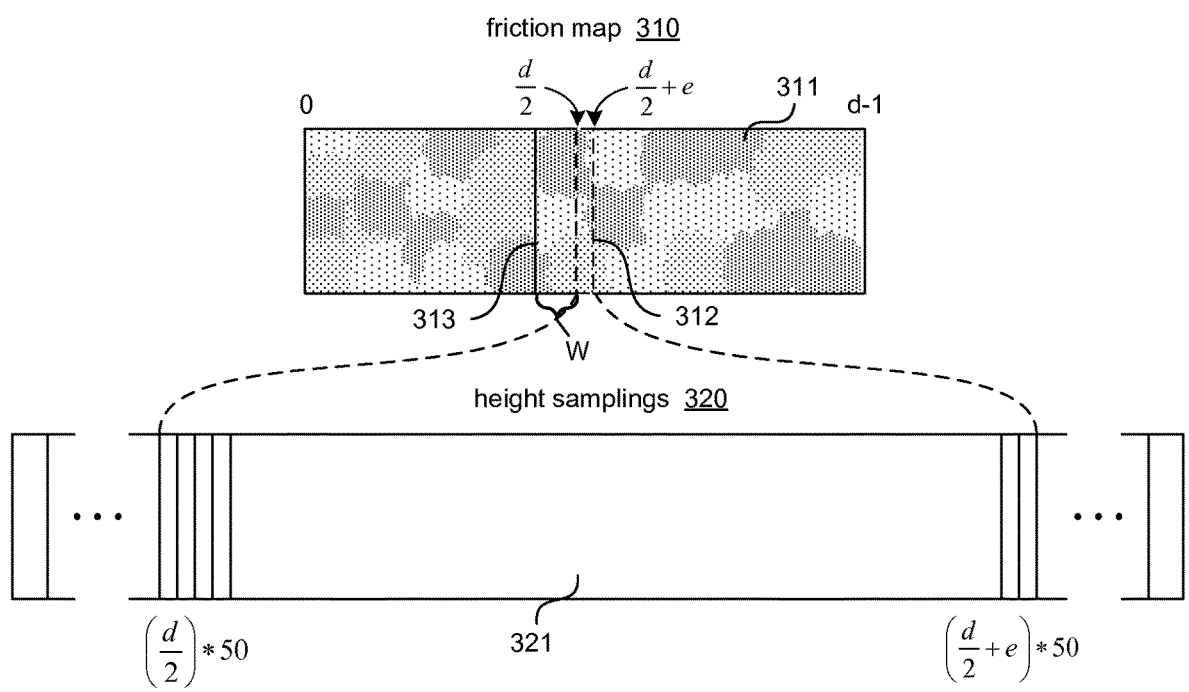
FIG. 3 is a diagram that illustrates an example relationship between a friction map and height measurements of a manufacturing process.

FIG. 3 is a diagram that illustrates an example relationship between a friction map and height measurements of a manufacturing process. A friction map 310 and height samplings 320 are analogous to the snapshot and video of FIG. 2. The friction map represents a measurement of the surface friction of a rectangular area of an object after the processing of the surface is complete. The height samplings represent the height within a window of the surface as a nozzle moves across the surface depositing a layer of material. The height within the window may be continuously measured by a height measurement array. The deposited material may flow after being deposited, so the height is subject to change. The shading 311 represents variations in the height of the surface. A friction map portion 312 illustrates the start and the end of the friction map that corresponds to a height sampling portion 321 of the height samplings. The surface is d units long. The friction map portion starts at distance d/2 from the left end of the surface and ends at distance d/2+e. The height samplings include d*100 samples, and the height sampling portion starts at sample d/2*100 and ends at sample (d/2+e)*100. When the height measurement array was positioned over the surface at distance d/2, it collected a height sampling 313 bounded on the right at distance d/2 and extending W units to the left. Each height sampling represents a moving window with a width of W units. As the height measurement device moves (e.g., continuously) with the nozzle, it captures 100 samplings per unit distance of the surface.

Figure 4:
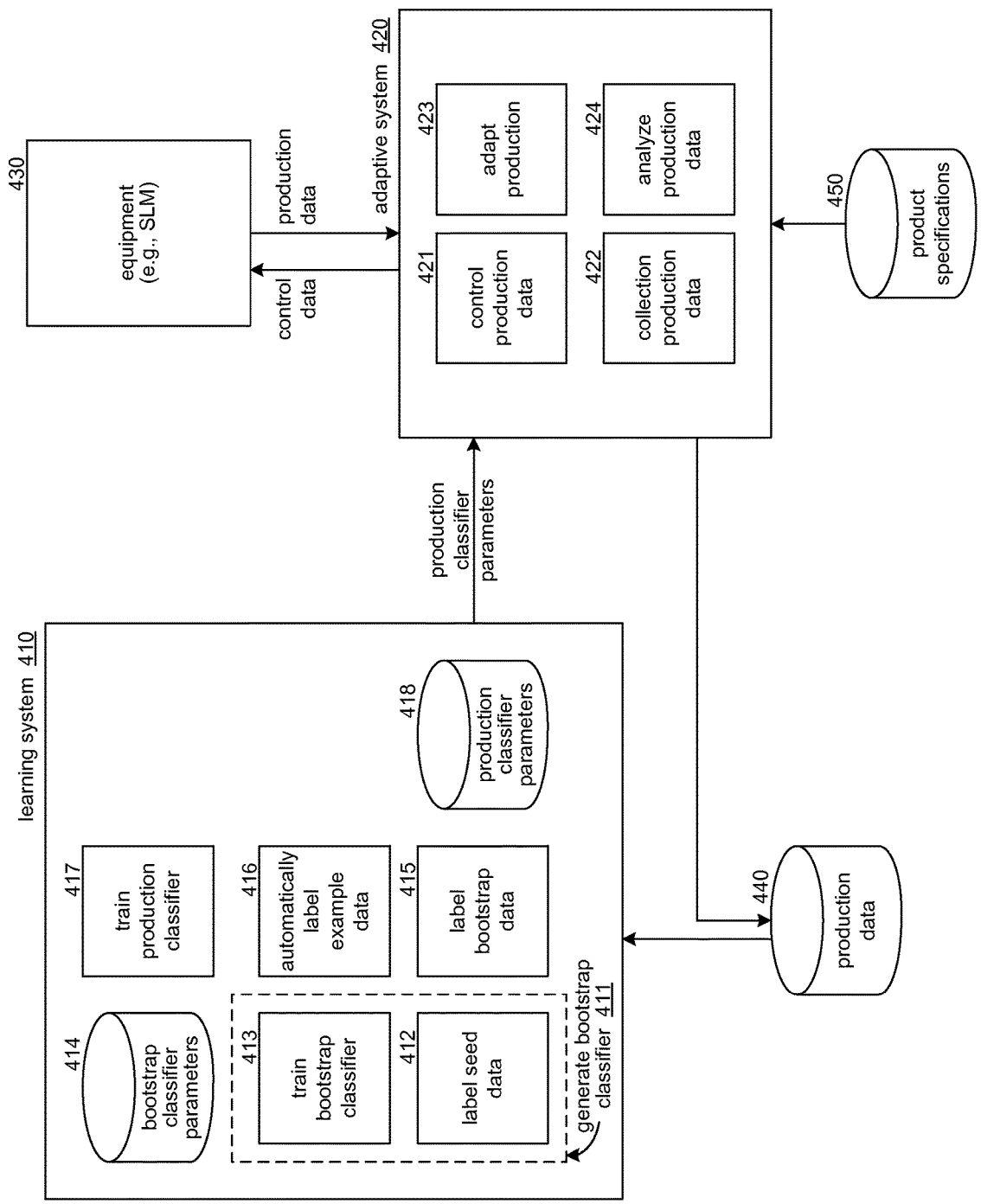
FIG. 4 is a block diagram that illustrates components of a production control system in some embodiments.

FIG. 4 is a block diagram that illustrates components of a production control system in some embodiments. The production control system includes a learning system 410, an adaptive system 420, equipment 430, a production data store 440, and a product specifications store 450. The learning system may include a generate bootstrap classifier component 411 that includes a label seed data component 412 and a train bootstrap classifier component 413 and may include a bootstrap classifier parameter store 414. The learning system includes a label bootstrap data component 415, an automatically label example data component 416, and a train production classifier component 417. The learning system also includes a production classifier parameter store 418. The label seed data component inputs seed data (e.g., from the production data store) and provides an interface through which a person can label the seed data. The train bootstrap classifier component trains a bootstrap classifier using the labeled seed data and stores the learned parameters of the classifier in the bootstrap classifier parameter store. The label bootstrap data component receives bootstrap data (e.g., from the production data store) and either provides an interface through which a person can label the bootstrap data or automatically labels the bootstrap data using the bootstrap classifier as represented by the bootstrap classifier parameters. The automatic label example data component labels the example data based on its correlation to the labeled bootstrap data. The train production classifier trains the production classifier using the labeled example data as training data and stores the parameters of the production classifier in the production classifier parameter store.

The adaptive system includes a control production component 421, a collect production data component 422, an adapt production component 423, and an analyze production data component 424. The control production component retrieves product specification information from the product specifications store and generates control data to control the equipment in accordance with the product specifications. The collect production data component collects production data from the various sensors associated with the equipment and stores the production data in the production data store. The adapt production component receives production data, invokes the analyze production data component to determine whether corrective action is needed, and sends instructions for any necessary corrective action to the control production component. The analyze production component labels production data using the production classifier represented by the production classifier parameters and determines whether the label indicates that corrective action is needed.

The components of the production control system may execute on computing systems that may include a central processing unit, input devices, output devices (e.g., display devices and speakers), storage devices (e.g., memory and disk drives), network interfaces, graphics processing units, accelerometers, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing systems may include desktop computers, laptops, tablets, e-readers, personal digital assistants, smartphones, gaming devices, servers, and so on. The learning system may execute on servers of a data center, massively parallel systems, and so on. The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on it or may be encoded with computer-executable instructions or logic that implements components of the production control system. The data transmission media is used for transmitting data via transitory, propagating signals or carrier waves (e.g., electromagnetism) via a wired or wireless connection. The computing systems may include a secure cryptoprocessor as part of a central processing unit for generating and securely storing keys and for encrypting and decrypting data using the keys.

The production control system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various examples. Aspects of the production control system may be implemented in hardware using, for example, an application-specific integrated circuit (ASIC).

Figure 5:
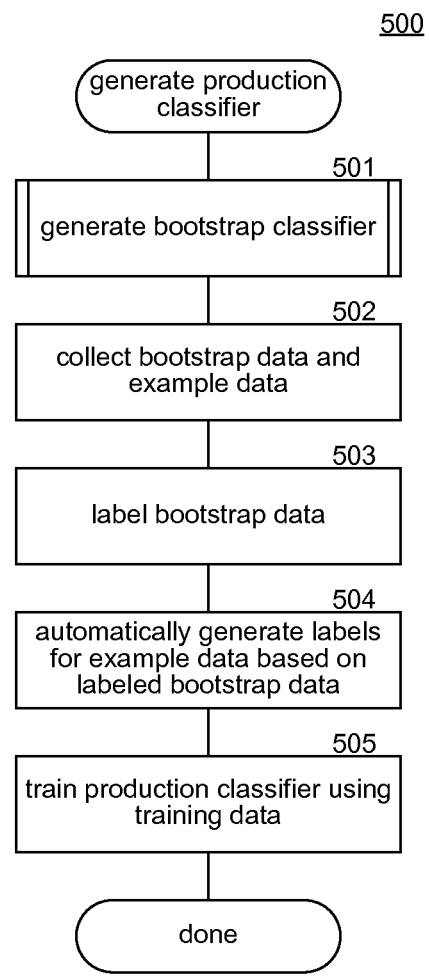
FIG. 5 is a flow diagram that illustrates the processing of a generate production classifier component in some embodiments.

FIG. 5 is a flow diagram that illustrates the processing of a generate production classifier component in some embodiments. A generate production classifier component 500 labels bootstrap data either automatically or manually, labels the corresponding example data, and trains the production classifier. In block 501, the component optionally invokes a generate bootstrap classifier component to generate a bootstrap classifier using seed data. In block 502, the component collects bootstrap data and example data. In block 503, the component labels the bootstrap data. The component may label the bootstrap data using a bootstrap classifier or may direct a person to manually label the bootstrap data. In block 504, the component automatically labels the example data based on the labeled bootstrap data for use as training data. In block 505, the component trains the production classifier using the training data, stores the parameters of the production classifier in the production classifier parameter store, and then completes.

Figure 6:
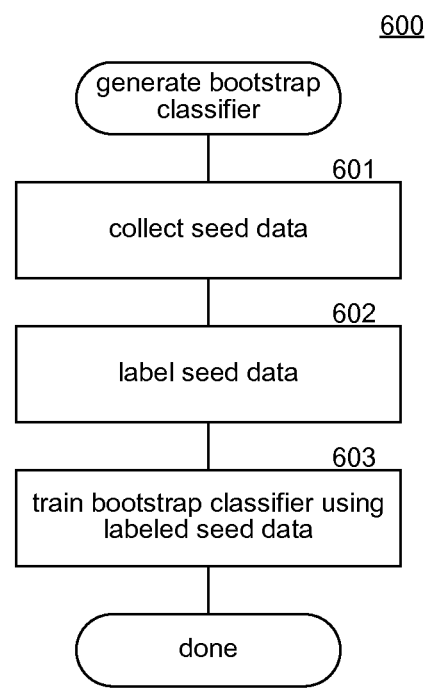
FIG. 6 is a flow diagram that illustrates the processing of a generate bootstrap classifier component in some embodiments.

FIG. 6 is a flow diagram that illustrates the processing of a generate bootstrap classifier component in some embodiments. A generate bootstrap classifier component 600 uses manually labeled seed data to train a bootstrap classifier. In block 601, the component collects the seed data. The seed data is of the same data type as the bootstrap data that will be used to automatically label the example data. The seed data may be retrieved from a production data store of production data from prior production runs. In block 602, the component directs a person to manually label the seed data for use as training data. In block 603, the component trains the bootstrap classifier using the labeled seed data, stores the parameters of the bootstrap classifier in the bootstrap classifier parameter store, and then completes.

Figure 7:
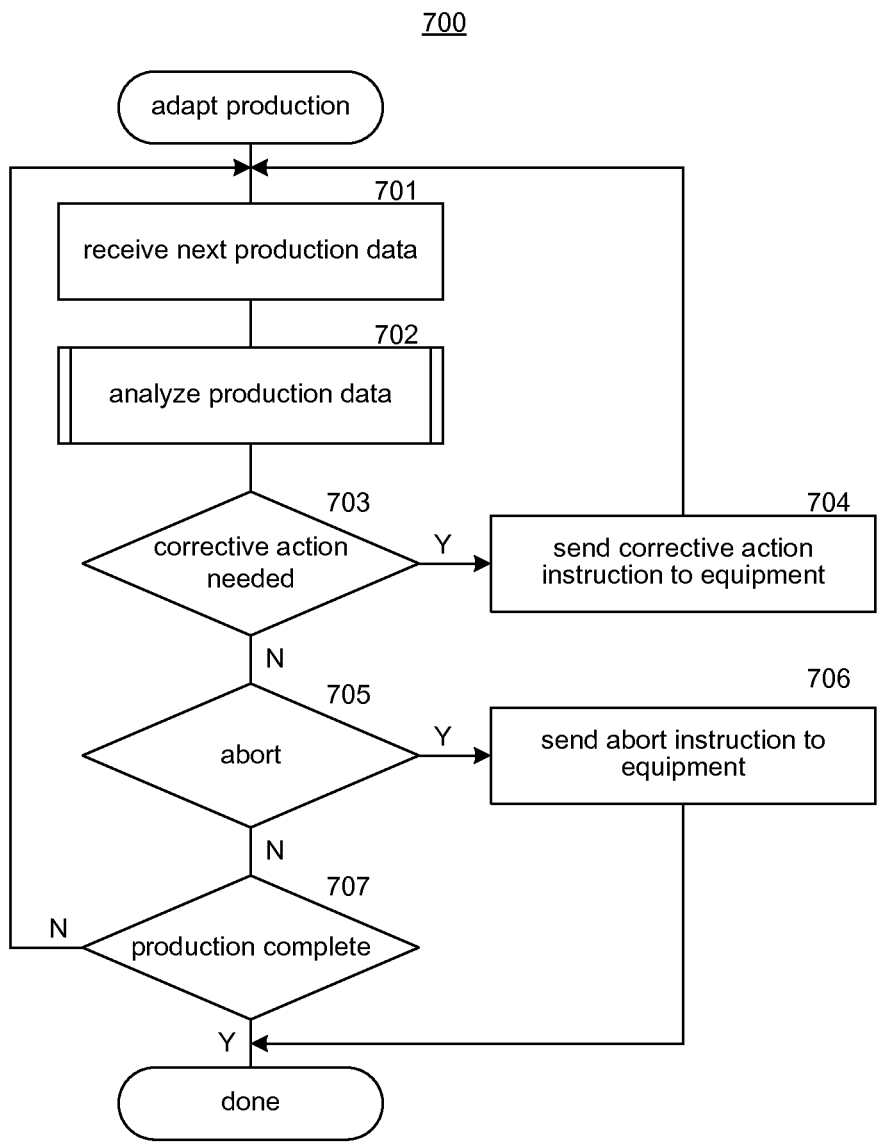
FIG. 7 is a flow diagram that illustrates an adapt production component in some embodiments.

FIG. 7 is a flow diagram that illustrates an adapt production component in some embodiments. An adapt production component 700 loops receiving production data, analyzing the production data, and sending instructions relating to corrective actions that may be needed. In block 701, the component receives the next production data from the production equipment. In block 702, the component invokes an analyze production data component to analyze the production data to determine whether corrective action is needed. In decision block 703, if the analysis indicates that corrective action is needed, then the component continues at block 704, else the component continues at block 705. In block 704, the component sends corrective action instructions to the equipment and loops to block 701 to receive the next production data. In decision block 705, if the analysis indicates to abort the production, then the component continues at block 706, else the component continues at block 707. In block 706, the component sends abort instructions to the equipment and then completes. In decision block 707, if the production is complete, then the component completes, else the component loops to block 701 to receive the next production data.

Figure 8:
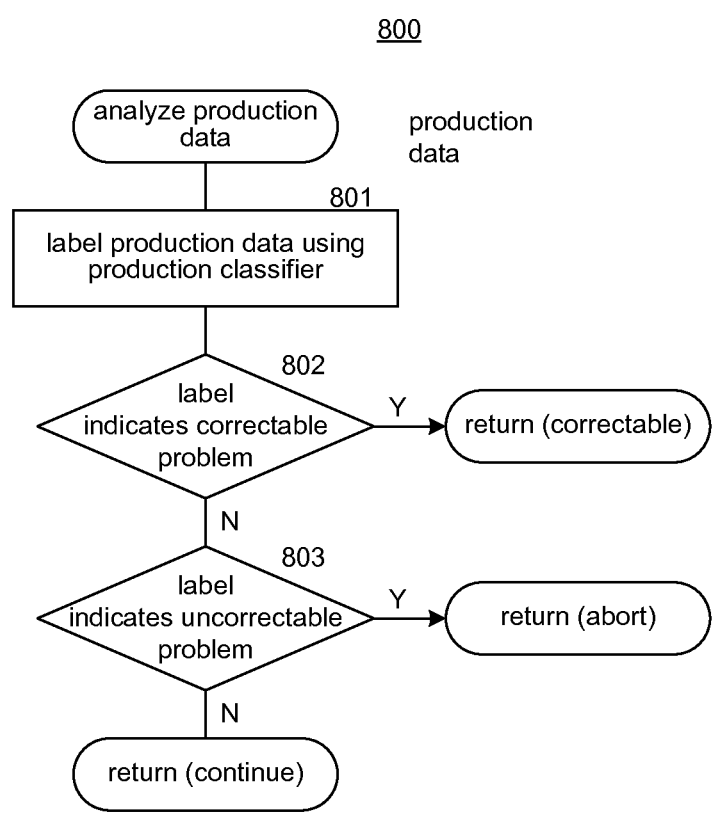
FIG. 8 is a flow diagram that illustrates processing of an analyze production data component in some embodiments.

FIG. 8 is a flow diagram that illustrates processing of an analyze production data component in some embodiments. An analyze production data component 800 is passed production data and determines whether corrective action is needed. In block 801, the component labels the production data using the production classifier as specified by the parameters in the production classifier parameter store. In decision block 802, if the label indicates that a correctable problem has been encountered, then the component returns an indication that the problem is correctable, else the component continues at block 803. In decision block 803, if the label indicates that a problem is uncorrectable, then the component returns an indication to abort the production, else the component returns an indication to continue the production.

Embodiment 1

A method performed by a computing device of generating a classifier to label data of a target data type, the data representing an activity, the method comprising receiving bootstrap data and example data, the bootstrap data and the example data having a correlation in space or time, the bootstrap data and the example data representing the activity, the example data being of the target data type; receiving from a user a labeling of the bootstrap data to generate labeled bootstrap data; automatically labeling the example data based on the correlation to generate training data; and training the classifier based on the training data.

Embodiment 2

The method of embodiment 1 wherein the activity is a manufacturing process and the bootstrap data is snapshot data of the manufacturing process and the example data is video data of the manufacturing process.

Embodiment 3

The method of any combination of embodiments 1 through 2 further comprising applying the trained classifier to label newly collected video data during the manufacturing process and providing instructions to alter the manufacturing process in real time.

Embodiment 4

The method of any combination of embodiments 1 through 3 wherein a label indicates whether a characteristic of a product is acceptable or not acceptable.

Embodiment 5

The method of any combination of embodiments 1 through 4 wherein labels that indicate that the characteristic is not acceptable include a label indicating that manufacturing of the product should be aborted and a label indicating that the characteristic is correctable during the manufacturing process.

Embodiment 6

The method of any combination of embodiments 1 through 5 wherein the activity is a manufacturing process and the bootstrap data is from a first stream of sensor data of the manufacturing process and the example data is from a second stream of sensor data of the manufacturing process.

Embodiment 7

The method of any combination of embodiments 1 through 6 further comprising applying the trained classifier to label newly collected example data during the manufacturing process and providing instructions to alter the manufacturing process in real time.

Embodiment 8

The method of any combination of embodiments 1 through 7 wherein a label indicates whether a characteristic of a product is acceptable or not acceptable.

Embodiment 9

The method of any combination of embodiments 1 through 8 wherein labels that indicate that the characteristic is not acceptable include a label indicating that manufacturing of the product should be aborted and a label indicating that the characteristic is correctable during the manufacturing process.

Embodiment 10

The method of any combination of embodiments 1 through 9 wherein the activity is additive manufacturing.

Embodiment 11

The method of any combination of embodiments 1 through 9 wherein the activity is in a field that is selected from a group consisting of manufacturing, oceanography, meteorology, traffic engineering, container processing, medical imaging, autonomous vehicle operations, and satellite monitoring.

Embodiment 12

The method of any combination of embodiments 1 through 11 wherein the classifier is a neural network.

Embodiment 13

The method of embodiment any combination of embodiments 1 through 11 wherein the classifier is selected from a group consisting of a support vector machine, a decision tree, a k-nearest neighbor algorithm, a linear regression algorithm, a relevance vector machine, and ensembles of classifiers.

Embodiment 14

A method performed by a computing device of generating a classifier to label data of a target data type, the method comprising: receiving seed data having a seed data type; receiving from a user a labeling of the seed data to generate labeled seed data; training a bootstrap classifier to label data of the seed data type using the labeled seed data; receiving bootstrap data and example data, the bootstrap data and example data representing different data streams, the bootstrap data being of the seed data type and the example data being of the target data type; applying the bootstrap classifier to label the bootstrap data to generate training data; and training a production classifier to label data of the target data type using the training data.

Embodiment 15

The method of embodiment 14 wherein the seed data, the bootstrap data, and the example data are collected during different occurrences of same activity.

Embodiment 16

The method of any combination of embodiments 14 through 15 wherein the bootstrap data and the corresponding example data are collected during the same occurrence of an activity.

Embodiment 17

The method of any combination of embodiments 14 through 16 wherein the bootstrap data is snapshot data of a manufacturing process and the example data is video data of the manufacturing process.

Embodiment 18

The method any combination of embodiments 14 through 17 further comprising applying the production classifier to label newly collected video data during a manufacturing process and providing instructions to alter the manufacturing process in real time.

Embodiment 19

The method of any combination of embodiments 14 through 18 wherein a label indicates whether a characteristic of a product is acceptable or not acceptable.

Embodiment 20

The method of any combination of embodiments 14 through 19 wherein labels that indicate that the characteristic is not acceptable include a label indicating that manufacturing of the product should be abandoned and a label indicating that the characteristic is correctable during the manufacturing process.

Embodiment 21

The method of any combination of embodiments 14 through 20 wherein the bootstrap data is from a first stream of sensor data of the activity and the example data is from a second stream of sensor data of the activity.

Embodiment 22

The method of any combination of embodiments 14 through 21 further comprising applying the production classifier to label newly collected example data during the activity and providing instructions to alter the activity in real time.

Embodiment 23

The method of any combination of embodiments 14 through 12 wherein a label indicates whether a characteristic of an output of the activity is acceptable or not acceptable.

Embodiment 24

The method of any combination of embodiments 14 through 23 wherein labels that indicate that the characteristic is not acceptable include a label indicating that the activity should be abandoned and a label indicating that the characteristic is correctable during the activity.

Embodiment 25

The method of any combination of embodiments 14 through 24 wherein the seed data, the bootstrap data, and the example data are collected during additive manufacturing.

Embodiment 26

The method of any combination of embodiments 14 through 24 wherein the received data relates to a field that is selected from a group consisting of manufacturing, oceanography, meteorology, traffic engineering, container processing, medical imaging, autonomous vehicle operations, and satellite monitoring.

Embodiment 27

The method of any combination of embodiments 14 through 26 wherein the classifier is a neural network.

Embodiment 28

One or more computing devices for generating a classifier to control an additive manufacturing process, a computing device comprising one or more memories storing computer-executable instructions for controlling a computing device, the instructions including a production classifier to label production data with a label, the production classifier being trained using labeled example data as training data, the labeled example data being automatically labeled based on labeled bootstrap data, the bootstrap data and the example data collected from sensors of an additive manufacturing process, the example data being of a target data type; and a component that receives production data from sensors during an additive manufacturing process, the production data being of the target data type; applies the production classifier to label the production data; and controls in real time the additive manufacturing process based on the labels; and one or more processors for executing the instructions stored in the one or more memories.

Embodiment 29

The one or more computing devices of embodiment 28 wherein a label of the production data indicates whether the product is acceptable and, if it is not acceptable, whether a problem with the product is correctable or not.

Embodiment 30

The one or more computing devices of any combination of embodiments 28 through 29 wherein the instructions further comprise instructions including a bootstrap classifier to label bootstrap data, the bootstrap classifier being trained using labeled seed data as training data, the seed data being collected from sensors of the additive manufacturing process; and a component to automatically label the bootstrap data using the bootstrap classifier.

Embodiment 31

The one or more computing devices of any combination of embodiments 28 through 30 wherein the instructions further comprise instructions including a component to retrain the production classifier using bootstrap data and example data of current production data, the bootstrap data of the current production data being labeled using the bootstrap classifier.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

The invention claimed is:

1. A method performed by a computing device of generating a classifier to label data of a target data type, the data representing an activity, the method comprising:
receiving bootstrap data and example data, the bootstrap data and the example data having a correlation in space or time, the bootstrap data and the example data representing the activity, the example data being of the target data type;
receiving from a user a labeling of the bootstrap data to generate labeled bootstrap data;
automatically labeling the example data based on the correlation to generate training data that includes the example data and labels; and
training the classifier based on the training data, the classifier for inputting data of the target data type and outputting a label.

2. The method of claim 1 wherein the activity is additive manufacturing.

3. The method of claim 1 wherein the activity is in a field that is selected from a group consisting of manufacturing, oceanography, meteorology, traffic engineering, container processing, medical imaging, autonomous vehicle operations, and satellite monitoring.

4. The method of claim 1 wherein the classifier is a neural network.

5. The method of claim 1 wherein the classifier is selected from a group consisting of a support vector machine, a decision tree, a k-nearest neighbor algorithm, a linear regression algorithm, a relevance vector machine, and ensembles of classifiers.

6. A method performed by a computing device of generating a classifier to label data of a target data type, the data representing an activity, the method comprising:
receiving bootstrap data and example data, the bootstrap data and the example data having a correlation in space or time, the bootstrap data and the example data representing the activity, the example data being of the target data type;
receiving from a user a labeling of the bootstrap data to generate labeled bootstrap data;
automatically labeling the example data based on the correlation to generate training data; and
training the classifier using a machine learning technique based on the training data
wherein the activity is a manufacturing process and the bootstrap data is snapshot data of the manufacturing process and the example data is video data of the manufacturing process.

7. The method of claim 6 further comprising applying the trained classifier to label newly collected video data during the manufacturing process and providing instructions to alter the manufacturing process in real time.

8. The method of claim 7 wherein a label indicates whether a characteristic of a product is acceptable or not acceptable.

9. The method of claim 8 wherein labels that indicate that the characteristic is not acceptable include a label indicating that manufacturing of the product should be aborted and a label indicating that the characteristic is correctable during the manufacturing process.

10. A method performed by a computing device of generating a neural network classifier to label data of a target data type, the data representing an activity, the method comprising:
receiving bootstrap data and example data, the bootstrap data and the example data having a correlation in space or time, the bootstrap data and the example data representing the activity, the example data being of the target data type;
receiving from a user a labeling of the bootstrap data to generate labeled bootstrap data;
automatically labeling the example data based on the correlation to generate training data; and
training the neural network classifier based on the training data
wherein the activity is a manufacturing process and the bootstrap data is from a first stream of sensor data of the manufacturing process and the example data is from a second stream of sensor data of the manufacturing process.

11. The method of claim 10 further comprising applying the trained neural network classifier to label newly collected example data during the manufacturing process and providing instructions to alter the manufacturing process in real time.

12. The method of claim 11 wherein a label indicates whether a characteristic of a product is acceptable or not acceptable.

13. The method of claim 12 wherein labels that indicate that the characteristic is not acceptable include a label indicating that manufacturing of the product should be aborted and a label indicating that the characteristic is correctable during the manufacturing process.

14. A method performed by a computing device of generating a classifier to label data of a target data type, the method comprising:
receiving seed data having a seed data type;
receiving from a user a labeling of the seed data to generate labeled seed data;
training a bootstrap classifier to label data of the seed data type using the labeled seed data;
receiving bootstrap data and example data, the bootstrap data and example data representing different data streams, the bootstrap data being of the seed data type and the example data being of the target data type;
applying the bootstrap classifier to label the bootstrap data
automatically labeling the example data based on the labeled bootstrap data to generate training data; and
training a production classifier to label data of the target data type using the training data.

15. The method of claim 14 wherein the seed data, the bootstrap data, and the example data are collected during different occurrences of same activity.

16. The method of claim 15 further comprising applying the production classifier to label newly collected video data during a manufacturing process and providing instructions to alter the manufacturing process in real time.

17. The method of claim 16 wherein a label indicates whether a characteristic of a product is acceptable or not acceptable.

18. The method of claim 17 wherein labels that indicate that the characteristic is not acceptable include a label indicating that manufacturing of the product should be abandoned and a label indicating that the characteristic is correctable during the manufacturing process.

19. The method of claim 14 wherein the bootstrap data and the corresponding example data are collected during the same occurrence of an activity.

20. The method of claim 14 wherein the bootstrap data is from a first stream of sensor data of the activity and the example data is from a second stream of sensor data of the activity.

21. The method of claim 14 wherein the seed data, the bootstrap data, and the example data are collected during additive manufacturing.

22. The method of claim 14 wherein the received data relates to a field that is selected from a group consisting of manufacturing, oceanography, meteorology, traffic engineering, container processing, medical imaging, autonomous vehicle operations, and satellite monitoring.

23. The method of claim 14 wherein the classifier is a neural network.

24. A method performed by a computing device of generating a classifier to label data of a target data type, the method comprising:
receiving seed data having a seed data type;
receiving from a user a labeling of the seed data to generate labeled seed data;
training a bootstrap classifier to label data of the seed data type by applying a machine leaning technique with the labeled seed data as input;
receiving bootstrap data and example data, the bootstrap data and example data representing different data streams, the bootstrap data being of the seed data type and the example data being of the target data type;
applying the bootstrap classifier to label the bootstrap data to generate training data; and
training a production classifier to label data of the target data type by applying a machine learning technique with training data as input
wherein the bootstrap data is snapshot data of a manufacturing process and the example data is video data of the manufacturing process.

25. A method performed by a computing device of generating a classifier to label data of a target data type, the method comprising:
receiving seed data having a seed data type;
receiving from a user a labeling of the seed data to generate labeled seed data;
training a bootstrap classifier to label data of the seed data type using the labeled seed data;
receiving bootstrap data and example data, the bootstrap data and example data representing different data streams, the bootstrap data being of the seed data type and the example data being of the target data type;
applying the bootstrap classifier to label the bootstrap data to generate training data;
training a neural network as a production classifier to label data of the target data type using the training data; and
applying the production classifier to label newly collected example data during the activity and providing instructions to alter the activity in real time
wherein the bootstrap data is from a first stream of sensor data of the activity and the example data is from a second stream of sensor data of the activity.

26. A method performed by a computing device of generating a classifier to label data of a target data type, the method comprising:
receiving seed data having a seed data type;
receiving from a user a labeling of the seed data to generate labeled seed data;
training a bootstrap classifier to label data of the seed data type using the labeled seed data;
receiving bootstrap data and example data, the bootstrap data and example data representing different data streams, the bootstrap data being of the seed data type and the example data being of the target data type;
applying the bootstrap classifier to label the bootstrap data to generate training data;
training a production classifier to label data of the target data type using the training data; and
applying the production classifier to label newly collected example data during the activity and providing instructions to alter the activity in real time
wherein the bootstrap classifier and the production classifier are selected from a group consisting of a support vector machine, a decision tree, a k-nearest neighbor algorithm, a linear regression algorithm, a relevance vector machine, and ensembles of classifiers
wherein the bootstrap data is from a first stream of sensor data of the activity and the example data is from a second stream of sensor data of the activity and
wherein a label indicates whether a characteristic of an output of the activity is acceptable or not acceptable.

27. The method of claim 26 wherein labels that indicate that the characteristic is not acceptable include a label indicating that the activity should be abandoned and a label indicating that the characteristic is correctable during the activity.

28. One or more computing devices for generating a classifier to control an additive manufacturing process, a computing device comprising:
one or more memories storing computer-executable instructions for controlling a computing device, the instructions including:
a production classifier to label production data with a label, the production classifier being trained using labeled example data as training data, the labeled example data being automatically labeled based on labeled bootstrap data, the bootstrap data and the example data collected from sensors of an additive manufacturing process, the example data being of a target data type; and
a component that
receives production data from sensors during an additive manufacturing process, the production data being of the target data type;
applies the production classifier to label the production data; and
controls in real time the additive manufacturing process based on the labels; and
one or more processors for executing the instructions stored in the one or more memories.

29. The one or more computing devices of claim 28 wherein a label of the production data indicates whether the product is acceptable and, if it is not acceptable, whether a problem with the product is correctable or not.

30. The one or more computing devices of claim 28 wherein the instructions further comprise instructions including:
a bootstrap classifier to label bootstrap data, the bootstrap classifier being trained using labeled seed data as training data, the seed data being collected from sensors of the additive manufacturing process; and
a component to automatically label the bootstrap data using the bootstrap classifier.

31. The one or more computing devices of claim 30 wherein the instructions further comprise instructions including a component to retrain the production classifier using bootstrap data and example data of current production data, the bootstrap data of the current production data being labeled using the bootstrap classifier.

32. One or more computing systems for controlling production equipment during an additive manufacturing process, the one or more computing systems comprising:
one or more computer-readable storage mediums storing computer-executable instructions for controlling the one or more computing system to:
access a production classifier to label production data with a label, the production classifier being trained using machine learning with labeled example data as training data, the labeled example data being automatically labeled based on labeled bootstrap data, the bootstrap data and the example data collected from sensors of an additive manufacturing process, the example data being of a target data type; and
receive production data from sensors of the production equipment during an additive manufacturing process, the production data being of the target data type;
apply the production classifier to label the production data; and
control in real time the production equipment during the additive manufacturing process based on the labels; and
one or more processors for executing the computer-executable instructions stored in the one or more computer-readable storage mediums.

33. One or more computing systems for training a neural network for use in controlling production equipment during manufacturing process, the one or more computing systems comprising:
one or more computer-readable storage mediums storing computer-executable instructions for controlling the one or more computing system to:
access bootstrap data and example data, the bootstrap data and the example data having a correlation in space or time, the bootstrap data and the example data representing the activity, the example data being of the target data type, the bootstrap data and the example data collected from production equipment during a manufacturing process;
receive from a user a labeling of the bootstrap data to generate labeled bootstrap data;
automatically label the example data based on the correlation to generate training data; and
train the neural network based on the training data; and
one or more processors for executing the computer-executable instructions stored in the one or more computer-readable storage mediums.

34. One or more computing systems for identifying whether corrective action is needed when manufacturing a product, the one or more computing systems comprising:
one or more computer-readable storage mediums storing computer-executable instructions for controlling the one or more computing system to:
access a production classifier for labelling production data to indicate whether corrective action is needed, the production classifier being trained using labeled example data as training data, the labeled example data being automatically labeled based on labeled bootstrap data; and
receive production data from sensors during the manufacturing of the product; and
apply the production classifier to label the production data to indicate whether corrective action is needed; and
one or more processors for executing the computer-executable instructions stored in the one or more computer-readable storage mediums.

* * * * *